W. P. NEWHALL.

Hydrant.

No. 5,064. Reissued Sep. 17, 1872.

Witnesses.

Charles L Barrett

David Naugle

Inventor

Walter P Newhall by assignees

Daniel D Mott

Harriet A Davison

AM. PHOTO-LITHOGRAPHIC CO. N.Y. (OSBORNE'S PROCESS)

UNITED STATES PATENT OFFICE.

DANIEL D. NASH, OF NEW YORK, N. Y., AND HARRIET A. DAVISON, OF BERGEN COUNTY, NEW JERSEY, ASSIGNEES, BY MESNE ASSIGNMENTS, OF WALTER P. NEWHALL, DECEASED.

IMPROVEMENT IN HYDRANTS.

Specification forming part of Letters Patent No. 60,230, dated December 4, 1866; reissue No. 5,064, dated September 17, 1872.

*To all whom it may concern:*

Be it known that I, WALTER P. NEWHALL, of the city, county and State of New York, have invented certain new and useful Improvements in Hydrants or Drinking-Fountains; and do hereby declare the following to be a full description thereof, reference being had to the accompanying drawing forming a part of this specification, the same letters of reference, wherever they occur, referring to like parts.

Figure 1:
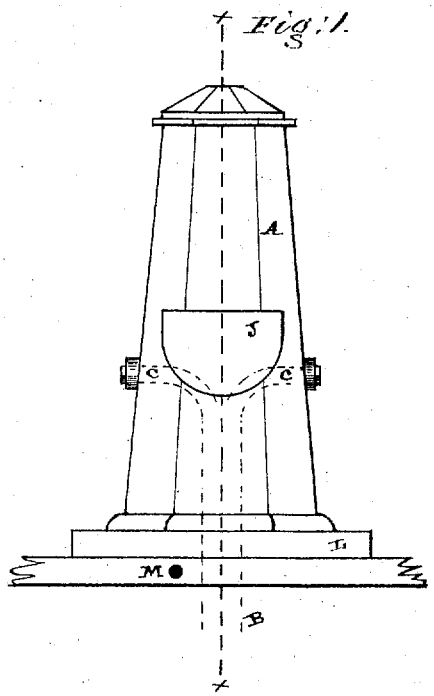
Figure 2:
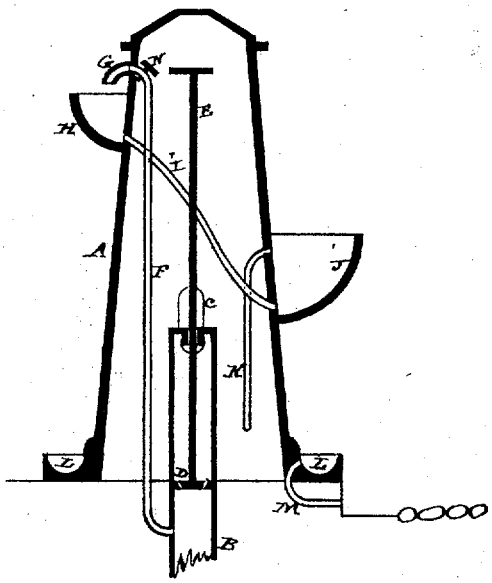
Figure 3:
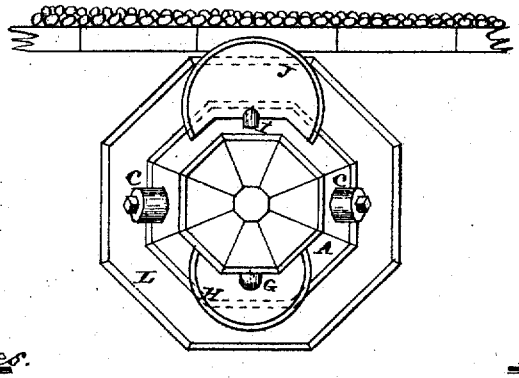

Figure 1 represents an exterior side view of the hydrant or fountain. Fig. 2 is a vertical-cut section of the same through the line *x x*, Fig. 1. Fig. 3 is a plan view of the same.

The object of my invention is to supply a want or necessity found to exist in all large towns and cities dependent upon reservoirs and artificial water-works—that is, to provide a constant supply of cool water, in an economical manner, in suitable and convenient drinking-basins for horses, cows, &c., and the smaller domesticated animals, dogs, cats, &c., as well as a suitable separate basin for the use of men, women, and children.

And the nature of my invention consists, first, in combining with the exterior case of a hydrant or drinking-fountain two or more basins at different altitudes for economically supplying water to horses, cows, &c., and the smaller domesticated animals, as well as to men, women, and children; second, in combining, with the two or more drinking-basins of a hydrant or drinking-fountain a series of conduits or pipes connecting directly with the street-pipe, and transmitting the water successively from the upper to the lower basin for the purpose of keeping a constant supply of cool water in the several basins for the use of men and animals; third, combining the said drinking-hydrant or fountain with a fire-hydrant.

To enable others to construct and use my improvements I will proceed to give a more particular description of the same.

Letter A represents the exterior of the hydrant or drinking-fountain, constructed in any convenient shape, and having on its sides, at different altitudes, two or more drinking-troughs or basins, H, J, and L. The upper trough or basin H is intended for the supply of water for men, women, and children, and to collect the waste water discharged therein from the feed-pipe F through the spout G, or other suitable outlet. The trough or basin J is situated on the opposite side to the upper basin, and at a convenient distance from the ground, and sufficient area or dimensions to afford easy access thereto for giving drink to horses and cows, by means of the constant supply of water to the basin through the pipe I, communicating with the two basins H and J; and the third trough or basin L is situated at a lower level than the basin J, at or near the base of the hydrant, and may extend all round its base, as shown in the drawing, or only partially round it, as may be thought most convenient. The object of this basin is to supply a drinking place for dogs, cats, goats, sheep, poultry, &c., according to the place where the fountain is set up. Thus, in large cities where there are always large numbers of dogs running at large in the streets, they are often greatly distressed for want of drinking-water. By this means a constant supply of cool water will always be within their reach, and have a tendency to preserve their health and lessen the disease of hydrophobia; and where the fountain is placed in yards or parks it will afford convenient drinking-places to all the smaller domesticated animals on the place. To supply the water to the lower basin L a pipe, K, is inserted into side of the basin J a short distance below its top or rim, so as to take off the excess of water in it above that point and deliver it to the lower basin L. From this basin the excess of water is discharged into a sewer or waste-pipe by means of a pipe, M, inserted in its sides near the top of the basin. From this arrangement of the basins and pipes it will be obvious that the water flowing through the pipe F, which may be regulated by the stop-cock N, supplies, with one stream, the various basins named, and thereby greatly economizing the water, and at the same time the running water, by constantly changing it in the several troughs or basins by degrees, tends to keep it fresh and cool. When desired a fire-plug valve, D, may be combined with the hydrant or drinking-fountain. This is done by connecting the fire-plug with the street-main water-pipe, as shown at B, and attaching to it one or more pipes, C C, for coupling the hose thereto. Letter E is a handle for operating the fire-plug valve D.

Having now described my invention, I will proceed to set forth what I claim and desire to secure by Letters Patent of the United States—

1. The new article of manufacture of a street, yard, or park drinking-hydrant or fountain, having thereon, at different altitudes, two or more exterior troughs or basins for the supply of fresh drinking-water to men, horses, and other smaller domesticated animals, substantially as hereinbefore described.

2. I also claim the combination of the pipes F, I, K, and M with the basins H, J, and L, arranged and operating substantially as hereinbefore described.

3. I also claim the combination of the fire-plug valve D and pipes C and I with the case A, having two or more exterior basins at different altitudes thereon, all arranged and operating as described.

WALTER P. NEWHALL.
By DANIEL D. NASH,
HARRIET A. DAVISON,
*Assignees.*

Witnesses:
CHARLES L. BARRITT,
FRANKLIN BARRITT.